United States Patent [19]

Kowata et al.

[11] Patent Number: 6,162,391
[45] Date of Patent: Dec. 19, 2000

[54] SCALE INHIBITION AGENT AND METHOD FOR USING SAME

[75] Inventors: Kenji Kowata; Akira Iimura; Shigeru Sato; Urara Usui, all of Kanagawa; Aya Sakaguchi, Tokyo, all of Japan

[73] Assignee: Kurita Water Industries Ltd., Japan

[21] Appl. No.: 09/083,007

[22] Filed: May 21, 1998

[30] Foreign Application Priority Data

May 23, 1997 [JP] Japan ..................................... 9-150367

[51] Int. Cl.[7] ................................ C02F 5/10; C09K 3/00; C23F 11/04
[52] U.S. Cl. .......................... 422/16; 252/175; 252/181; 252/389.2; 422/14; 210/697; 210/698
[58] Field of Search ..................................... 252/175, 181, 252/389.2, 390, 394; 422/16, 14; 210/697, 698

[56] References Cited

U.S. PATENT DOCUMENTS

| | | | |
|---|---|---|---|
| 4,923,634 | 5/1990 | Hoots et al. | 252/398.5 |
| 4,929,425 | 5/1990 | Hoots et al. | 422/13 |
| 5,141,655 | 8/1992 | Hen | 507/247 |
| 5,232,603 | 8/1993 | Denzinger et al. | 210/698 |
| 5,494,535 | 2/1996 | Keller et al. | 148/251 |
| 5,658,993 | 8/1997 | Denzinger et al. | 525/285 |
| 5,739,190 | 4/1998 | Hartmann et al. | 524/310 |

OTHER PUBLICATIONS

Derwent Abstract of Japanese Publication 10323697, Dec. 8, 1998.
Derwent Abstract of Japanese Publication 11104695. Assignee: Kurita Water Ind Ltd., Oct. 1, 1997.
Derwent Abstract of Japanese Publication 10310886. Inventor: Sato et al, Nov. 24, 1998.

*Primary Examiner*—Jill Warden
*Assistant Examiner*—LaToya Cross
*Attorney, Agent, or Firm*—Morrison Law Firm

[57] ABSTRACT

An agent for preventing scale formation and a method for preventing scale formation include a polymer which has at least 50% of N-vinyl formamide units or N-vinyl acetamide units and a phosphorus compound added to water in a cooling water system, a boiler water system, or the like. The scale preventing agent and scale preventing method of the present invention are effective in preventing the adherence of various types of scales which are generated in cooling water systems, boiler water systems, and the like. In particular, the present invention is effective in preventing the adherence of silica and calcium scale.

23 Claims, No Drawings

SCALE INHIBITION AGENT AND METHOD FOR USING SAME

BACKGROUND OF THE INVENTION

The present invention relates to an agent for preventing scale formation and a method for preventing scale formation. More particularly, the present invention relates to an agent for preventing scale formation and a method for the same which is effective in preventing scale formation in water systems, such as cooling water systems, boiler water systems, and the like. The present invention is particularly effective in preventing calcium and silicate scale formation.

Scale obstructions are generated on heat exchange surfaces and inside pipes which are in contact with water in a water system, such as a cooling water system, a boiler water system, or the like. The types of scales which are deposited include calcium carbonate, calcium sulfate, calcium sulfite, calcium phosphate, calcium silicate, magnesium silicate, magnesium hydroxide, zinc phosphate, zinc hydroxide, basic zinc carbonate, and the like. Scale formation is particularly troublesome in water systems that employ high concentration operation. In, for example, an open circulating cooling water system, high concentration operation is preferred to conserve resources and energy. However, when a high concentration operation is performed by reducing the amount of cooling water blow to the outside of the system, dissolved salts become concentrated in the water. In addition to the heat exchange surfaces becoming more likely to corrode, the solubility of the dissolved salts declines, resulting in scale formation. The resulting scale obstructions can become major impediments to the operation of boilers or heat exchange devices by reducing heat transfer efficiency and by narrowing pipes.

Polymers which contain carboxyl groups, such as polymerized maleic acid, acrylic acid, itaconic acid, and the like are often effective in inhibiting formation of calcium or magnesium scale. Furthermore, copolymers which combine monomers with a carboxyl group and monomers which contain a sulfonic acid group, such as vinyl sulfonic acid, allyl sulfonic acid, and 2-acrylamide-2-methylpropane sulfonic acid, are often used as scale preventing agents, depending on the water quality. To inhibit formation of silica scale, scale preventing agents such as acrylamide polymers, cation polymers, polyethylene glycol, and the like, have been proposed. Thus, different polymers have been used to inhibit scale formation, depending on the type of scale. However, to date no universal scale formation preventing agent has been described.

The water used in water systems is typically industrial water or tap water. These types of waters contain numerous and various ions. Particularly when conducting high concentration operations in a cooling water system or a boiler water system, for example, there is a need for a scale preventing agent which can effectively respond to all scale types. Currently, there is no scale preventing agent which satisfies this requirement. Of particular concern is the fact that there is no scale preventing agent which effectively prevents the adhesion of silica scale.

In Japanese Laid Open Patent Publication Number 61-107998, there is proposed a scale preventing agent which has an excellent effect in preventing silica scale formation. The scale preventing agent proposed in this publication contains acrylamide polymer and acrylic acid polymer. When the silica concentration is low, acrylamide polymer has a good scale preventing effect. However, when the silica concentration is high, the effect is reduced. In Japanese Laid Open Patent Publication Number 7-256266, there is disclosed a water treatment method in which a water soluble cationic polymer, halogenated aliphatic nitro alcohol, a low molecular weight carboxylic acid polymer, or phosphonic acid are added. However, because the proposed cation polymer is a quaternary ammonium salt, the cationic property is extremely strong. Under these conditions, the components of the water treatment method can form gel reaction products with silica. Furthermore, slime from microorganisms can also form easily. As a result, the use of the proposed water soluble cationic polymer is disadvantageous, because of problems arising from the clogging of pipes.

In Japanese Laid Open Patent Publication Number 2-31894, a scale preventing agent containing polyethylene glycol and a low molecular weight carboxylic acid polymer or phosphonic acid is proposed. However, although polyethylene glycol is effective in controlling the adherence of scale when the silica concentration is low, it is easily influenced by other ions, and the effect is not stable.

OBJECTS AND SUMMARY OF THE INVENTION

It is an object of the present invention to provide a scale formation preventing agent and a scale formation preventing method which is effective in preventing the adherence of various scales generated in water systems, such as cooling water systems, boiler water systems, and the like.

It is another object of the present invention to provide a scale formation preventing agent and scale formation preventing method which is effective in preventing the adherence of silica and calcium scales in water systems, such as cooling water systems, boiler water systems, and the like.

Briefly stated, an agent for preventing scale formation and a method for preventing scale formation include a polymer which has at least 50 mole % of N-vinyl formamide units or N-vinyl acetamide units and a phosphorus compound added to water in a cooling water system, a boiler water system, or the like. The scale preventing agent and scale preventing method of the present invention are effective in preventing the adherence of various types of scales which are generated in cooling water systems, boiler water systems, and the like. In particular, the present invention is effective in preventing the adherence of silica and calcium scale.

According to an embodiment of the present invention, a scale formation preventing agent for use in a cooling water system or a boiler water system comprises a polymer having at least 50% of N-vinyl formamide units or N-vinyl acetamide units and a phosphorus compound.

According to another embodiment of the present invention, a method for preventing scale formation in a cooling water system or a boiler water system comprises the step of adding a polymer having at least 50% of N-vinyl formamide units or N-vinyl acetamide units and a phosphorus compound to water used in the cooling water system or boiler water system.

The above, and other objects, features and advantages of the present invention will become apparent from the following description.

DETAILED DESCRIPTION OF THE PREFERRED EMBODIMENTS

The present inventors have discovered that a scale preventing agent comprising a polymer which has at least 50% of N-vinyl formamide units or N-vinyl acetamide units and a phosphorus compound has an excellent scale formation preventing effect in a water system. Compared to the scale preventing agents of the prior art, the scale formation preventing agent of the present invention shows an excellent effect in preventing the adherence of scale. It is particularly effective for preventing the adherence of silica and calcium scale.

In the present invention, a polymer which has at least 50% of monomer units containing N-vinyl formamide as represented by formula [1], or N-vinyl acetamide as represented by formula [2], is used.

   [1]

   [2]

There are no particular limitations to the manufacturing method for the N-vinyl formamide and N-vinyl acetamide monomers. For example, they may be made by reacting acetalydehyde with formamide or acetamide. The resulting N-(α-hydroxyethyl)formamide or N-(α-hydroxyethyl) acetamide is etherified by contact with alcohol. Thereafter, the etherified product is thermolyzed in the gaseous state at high temperatures. Alternatively, the etherified product can also be heated in the liquid state, and then thermolyzed. The generated N-vinyl formamide or N-vinyl acetamide can be removed during thermolysis.

In the present invention, polymers with at least 50% of N-vinyl formamide units or N-vinyl acetamide units may include: homopolymers of N-vinyl formamide; homopolymers of N-vinyl acetamide; copolymers of N-vinyl formamide and N-vinyl acetamide; partially hydrolyzed products of an N-vinyl formamide homopolymer; partially hydrolyzed products of an N-vinyl acetamide homopolymer; partially hydrolyzed products of a copolymer of N-vinyl formamide and N-vinyl acetamide; or copolymers of N-vinyl formamide or N-vinyl acetamide and a vinyl monomer. All mixed polymers and copolymers of N-vinyl formamide and N-vinyl acetamide may be used for the scale preventing agent of the present invention, so long as the N-vinyl formamide units and the N-vinyl acetamide units total at least 50%.

Vinyl monomers which are capable of polymerizing with N-vinyl formamide or N-vinyl acetamide may be used without any particular limitations, so long as the copolymer or the copolymer obtained by further hydrolysis is water-soluble. Examples of such vinyl monomers include nonionic monomers such as (meta)acrylamide, (meta)acrylonitryl, N-methyl (meta)acrylamide, N, N-dimethyl (meta) acrylamide, methyl (meta)acrylate, ethyl (meta)acrylate, styrene, allyl alcohol, hydroxyethyl (meta)acrylate, mono (meta)acrylate of (poly)ethylene oxide of mole number 1–30, monoallyl ether of (poly)ethylene oxide of mole number 1–30, and monovinyl ether of (poly)ethylene oxide of mole number 1–30; anionic monomers such as (meta) acrylic acid, alpha-hydroxyacrylic acid, crotonic acid, maleic acid, fumaric acid, and itaconic acid; and alkali metal salts of these. Further, such vinyl monomers include vinyl sulfonic acid, styrene sulfonic acid, 2-acrylamide-2-methyl propane sulfonic acid, 2-hydroxy-3-allyloxypropane sulfonic acid, isoprene sulfonic acid, and alkali metal salts of these. Further, such vinyl monomers include cationic monomers such as allyl amine, quaternary ammonium salts or tertiary salts of dimethyl amino ethyl (meta)acrylate and diethyl amino ethyl (meta)acrylate, and diallyl dimethyl ammonium chloride.

In the present invention, there are no particular limitations on the method of homopolymerization or polymerization of N-vinyl formamide or N-vinyl acetamide monomeric units.

Polymerization may be conducted as solution polymerization or bulk polymerization, but because the homopolymers of N-vinyl formamide or N-vinyl acetamide or the copolymers of N-vinyl formamide or N-vinyl acetamide used in the present invention are preferably water soluble or hydrophilic, water-based polymerization using water as the solvent is preferred. In water-based polymerization, an aqueous solution or water dispersion solution of the monomer is prepared, and the pH may be adjusted as required. After replacing the atmosphere with an inactive gas, the solution is heated to 50–100° C. Polymerization is then conducted by addition of a water soluble polymerization initiation agent. Examples of suitable polymerization initiation agents include azo compounds, such as 2, 2'-azobis (2-amidino propane)dihydrogen chloride, azobis-N, N'-dimethylene isobutyl amidine dihydrogen chloride, and 4,4'-azobis (4-cyano valerianic acid)-2-sodium; persulfate compounds, such as ammonium persulfate, sodium persulfate, and potassium persulfate; and peroxides, such as hydrogen peroxide, sodium periodate, and the like. Polymerization is normally completed after 3–6 hours. After cooling, an aqueous solution or water dispersion solution of a polymer can be obtained. Polymerization of N-vinyl formamide or N-vinyl acetamide monomeric units is not limited to being performed in an aqueous solvent, and may be conducted as solution polymerization, suspension polymerization, or emulsion polymerization in a general organic solvent.

In the present invention, homopolymers or copolymers of N-vinyl formamide or N-vinyl acetamide may also be hydrolyzed. Polymers containing a portion of N-vinyl formamide units or N-vinyl acetamide units hydrolyzed to N-vinyl amine units may be used, so long as at least 50% remain as N-vinyl formamide units or N-vinyl acetamide units. There are no particular limitations to the conditions of hydrolysis. For example, hydrolysis may be conducted under basic conditions by adding ammonia, primary amine, secondary amine or the like to an aqueous solution or water dispersion solution of the polymer, followed by addition of sodium hydroxide or the like. Alternatively, hydrolysis may be conducted under acidic conditions by adding inorganic acids, such as hydrochloric acid or the like, to the aqueous solution or water dispersion solution of the polymer, followed by heating.

In the present invention, the molecular weight of the polymer with at least 50% of N-vinyl formamide units or N-vinyl acetamide units is preferably between about 2,000 and about 1,000,000. If the molecular weight of the polymer is less than about 2,000, the scale formation preventing effect may be inadequate. If the molecular weight of the polymer exceeds 1,000,000, the viscosity of the solution becomes too great, and the solution may be difficult to handle. The molecular weight of the polymer can be determined by any appropriate means, such as gel permeation chromatography.

In the present invention, one type of polymer with at least 50% of N-vinyl formamide units or N-vinyl acetamide units may be used alone, or two or more types may be combined and used.

The scale preventing agent of the present invention also contains a phosphorus compound. There are no particular limitations on the phosphorus compound to be used. The following may be used with good results: sodium tripolyphosphate; sodium hexametaphosphate; nitro trimethylene phosphonic acid (NTMP); hydroxy ethylidene diphosphonic acid (HEDP); ethylene diamine tetramethylene phosphonic acid (EDTP); phosphono butane tricarboxylic acid (PBTC); amino methylene phosphonate (AMP); polyamino polyether methylene phosphonate (PAPEMP, Corrosion '96, The NACE Annual International Conference and Exposition, Mar. 24–29, 1996, Denver, Colo., U.S.A., paper number 575); phosphono polycarboxylic acid (POCA, CAS Registry No. 110224-99-2); and bis(poly-2-carboxyethyl)phosphinic acid (CAS Registry No. 71050-62-9). These phosphorus compounds may be used individually or in any combination.

There are also no particular limitations as to the form of the scale preventing agent. For example, a powder which is a mix of polymer with at least 50% of N-vinyl formamide units or N-vinyl acetamide units and the phosphorus compound may be dissolved in water before use and then used. Alternatively, an aqueous solution containing the polymer and the phosphorus compound may be used. Alternatively, a two-fluid type preparation containing an aqueous solution of a polymer and a separate aqueous solution of a phosphorus compound may be used.

In the present invention, there are no particular limitations on the ratio of the amount of the polymer with at least 50% of N-vinyl formamide units or N-vinyl acetamide units to the phosphorus compound. However, a weight ratio of polymer to phosphorus compound is preferably between 1:9 and 9:1. A weight ratio of polymer to phosphorus compound between 5:5 and 8:2 is even more preferable.

The scale formation preventing agent of the present invention can be added as an aqueous solution which is prepared at a concentration which is appropriate for the water system for which is to be used. Normally, it is preferable for the total concentration of polymer and phosphorus compound to be such that a concentration of 1–100 mg/liter in the water is achieved.

It is possible to use the scale formation preventing agent of the present invention together with one or more other scale preventing agents as needed. Examples of scale preventing agents which may be used in conjunction with the present invention include: polyacrylic acid, polymaleic acid, copolymers of acrylic acid and 2-acrylamide-2-methyl propane sulfonic acid, a reaction product of N, N, N', N'-tetramethyl ethylene diamine with epichlorohydrin, and a reaction product of N, N, N', N'-tetramethyl ethylene diamine with dichloroethyl ether. The scale formation preventing agent of the present invention may be further mixed with corrosion preventing agents, such as organic phosphonate, and/or antibacterial agents, such as hydrazine, and added as needed. Alternatively, these chemicals may be added separately.

When using the scale formation preventing agent and scale formation preventing method of the present invention, there are no particular limitations to the water quality or the operating conditions of the boiler or heat exchanging device. The present invention may be altered as described above to suit the operation requirements and water quality of any standard boiler and heat exchange device. The scale preventing agent and the scale preventing method of the present invention is effective in preventing scale such as calcium carbonate, calcium sulfate, calcium phosphate, zinc phosphate, zinc hydroxide, magnesium silicate, silica and the like which are generated in boilers and cooling water systems and which adhere to the heat transfer surface and the pipe walls. In particular, the present invention is effective in preventing adherence of silica scales.

The mechanism of how the scale preventing agent and scale preventing method of the present invention is particularly effective in preventing silica scale formation is not known. However, it is thought that the amide group of the N-vinyl formamide unit or the N-vinyl acetamide unit and the phosphate group or the phosphonic acid group of the phosphorus compound act synergistically against the silica hydroxide group, and effectively prevent adherence of silica scales to the wall surface.

EMBODIMENTS

The present invention is described below in further detail. The present invention is not limited to these embodiments.

The polymers and the phosphorus compounds used in the Embodiments and in the Comparative Examples are described in Tables 1 and 2, respectively.

TABLE 1

| Designation | Polymer | Molecular weight |
|---|---|---|
| A1 | poly-N-vinyl formamide | 80,000 |
| A2 | hydrolyzed product of poly-N-vinyl formamide (10 mole %) | 90,000 |
| A3 | copolymer of N-vinyl formamide and acrylamide (mole ratio 6:4) | 45,000 |
| A4 | copolymer of acrylic acid and hydroxyallyloxypropane sulfonic acid (mole ratio 8:2) | 9,000 |
| A5 | Copolymer of N-vinyl formamide and acrylamide (mole ratio 4:6) | 25,000 |
| A6 | sodium polyacrylamide | 5,000 |
| A7 | copolymer of N-vinyl acetamide and acrylamide (mole ratio 6:4) | 38,000 |

TABLE 2

| Designation | Phosphorus compound |
|---|---|
| P1 | sodium hexametaphosphate |
| P2 | hydroxy ethylidene diphosphonic acid |
| P3 | phosphono butane tricarboxylic acid |
| P4 | polyamino polyether methylene phosphonate [Calgon Co.] |
| P5 | sodium tripolyphosphate |
| P6 | nitro trimethylene phosphonic acid |
| P7 | ethylene diamine tetramethylene phosphonic acid |
| P8 | amino methylene phosphonate |
| P9 | phosphono poly carboxylic acid |
| P10 | bis(poly-2-carboxyethyl)phosphinic acid |

Scale Adherence Test Method

An open, circulating, cooling water system having a heat exchange area of approximately 0.25 $m^2$ and a water capacity of 0.45 $m^3$ was used. Distilled water and salts were added to Atsugi City water. This water was added to the cooling water system as circulating water and make up water. The cooling water system was operated for 30 days while maintaining the water quality at a constant value. The heat exchange device tube was made of material SUS304 (equivalent to 18-8 stainless steel, having 18% chromium component and 8% nickel component), and the outer diameter was 19 mm. The temperature of the circulating water at the inflow was 30° C., the temperature of the circulating water at the outflow was 50° C., and the circulating water flow rate was 0.5 m/s.

A fixed amount of scale formation preventing agent was added to the water system. Scale which adhered to the heat exchange tube after 30 days was collected. After washing the collected scale at 600° C., the CaO content and $SiO_2$ content were measured through standard analytical chemistry techniques. The scale adherence rate was expressed in units of $mg/cm^2/month$.

Embodiment 1

15 mg/liter of polymer A-1 and 5 mg/L of phosphorus compound P-1 were added to a water having the following water quality: pH 9.0, calcium hardness 350 mg/liter, M alkalinity 350 mg/liter, silica 150 mg/liter, and magnesium hardness 150 mg/liter. Scale adherence was tested as described above. The scale adherence rate was 4 mg/cm²/month for CaO and 2 mg/cm²/month for $SiO_2$.

Embodiment 2

15 mg/liter of polymer A-2 and 5 mg/L of phosphorus compound P-2 were added to water of the same water quality as Embodiment 1. Scale adherence was tested as described above. The scale adherence rate was 6 mg/cm²/month for CaO and 1 mg/cm²/month for $SiO_2$.

Embodiment 3

15 mg/liter of polymer A-7 and 5 mg/L of phosphorus compound P-4 were added to water having the same water quality as Embodiment 1. Scale adherence was tested as described above. The scale adherence rate was 6 mg/cm²/month for CaO and 2 mg/cm²/month for $SiO_2$.

Embodiment 4

12 mg/liter of polymer A-1 and 3 mg/L of polymer A-4, and 5 mg/liter of phosphorus compound P-2 were added to water having the same water quality as Embodiment 1. Scale adherence was tested as described above. The scale adherence rate was 4 mg/cm²/month for CaO and 1 mg/cm²/month for $SiO_2$.

Comparative Example 1

20 mg/liter of polymer A-1 was added to water having the same water quality as Embodiment 1. Scale adherence was tested as described above. The scale adherence rate was 21 mg/cm²/month for CaO and 16 mg/cm²/month for $SiO_2$.

Comparative Example 2

20 mg/liter of polymer A-2 was added to water having the same water quality as Embodiment 1. Scale adherence was tested as described above. The scale adherence rate was 25 mg/cm²/month for CaO and 13 mg/cm²/month for $SiO_2$.

Comparative Example 3

20 mg/liter of polymer A-4 was added to water having the same water quality as Embodiment 1. Scale adherence was tested as described above. The scale adherence rate was 48 mg/cm²/month for CaO and 38 mg/cm²/month for $SiO_2$.

Comparative Example 4

15 mg/liter of polymer A-6 5 mg/liter of phosphorus compound P-2 were added to water having the same water quality as Embodiment 1. Scale adherence was tested as described above. The scale adherence rate was 39 mg/cm²/month for CaO and 59 mg/cm²/month for $SiO_2$.

The results from Embodiments 1–3 and Comparative Examples 1–4 are shown in Table 3.

TABLE 3

| Example | Polymer Phosphorus compound | Concentration (mg/L) | Scale adhesion rate (mg/cm²/month) | |
|---|---|---|---|---|
| | | | CaO | $SiO_2$ |
| Embodiment 1 | A-1 | 15 | 4 | 2 |
| | P-1 | 5 | | |
| Embodiment 2 | A-2 | 15 | 6 | 1 |
| | P-2 | 5 | | |
| Embodiment 3 | A-7 | 15 | 6 | 2 |
| | P-4 | 5 | | |
| Embodiment 4 | A-1 | 12 | 4 | 1 |
| | A-4 | 3 | | |
| | P-2 | 5 | | |
| Comp. Ex. 1 | A-1 | 20 | 21 | 16 |
| Comp. Ex. 2 | A-2 | 20 | 25 | 13 |
| Comp. Ex. 3 | A-4 | 20 | 48 | 38 |
| Comp. Ex. 4 | A-6 | 15 | 39 | 59 |
| | P-2 | 5 | | |

Embodiment 5

15 mg/liter of polymer A-1 and 5 mg/L phosphorus compound P-1 were added to a water having the following water quality: pH 9.0, calcium hardness 350 mg/liter, M alkalinity 350 mg/liter, silica 200 mg/liter, and magnesium hardness 200 mg/liter. Thus, this water contained higher levels of silica and magnesium hardness than that tested in Embodiments 1–4. Scale adherence was tested as described above. The scale adherence rate was 5 mg/cm²/month for CaO and 4 mg/cm²/month for $SiO_2$.

Embodiment 6

15 mg/liter of polymer A-2 and 5 mg/L of phosphorus compound P-2 were added to water having the same water quality as Embodiment 5. Scale adherence was tested as described above. The scale adherence rate was 6 mg/cm²/month for CaO and 3 mg/cm²/month for $SiO_2$.

Embodiment 7

15 mg/liter of polymer A-3 and 5 mg/L of phosphorus compound P-3 were added to water having the same water quality as Embodiment 5. Scale adherence was tested as described above. The scale adherence rate was 6 mg/cm²/month for CaO and 4 mg/cm²/month for $SiO_2$.

Embodiment 8

12 mg/liter of polymer A-1, 3 mg/liter of polymer A-4, and 5 mg/L of phosphorus compound P-2 were added to water having the same water quality as Embodiment 5. Scale adherence was tested as described above. The scale adherence rate was 3 mg/cm²/month for CaO and 2 mg/cm²/month for $SiO_2$.

Comparative Example 5

20 mg/liter of polymer A-1 was added to water having the same water quality as Embodiment 5. Scale adherence was tested as described above. The scale adherence rate was 26 mg/cm²/month for CaO and 14 mg/cm²/month for $SiO_2$.

Comparative Example 6

20 mg/liter of polymer A-3 was added to water having the same water quality as Embodiment 5. Scale adherence was tested as described above. The scale adherence rate was 21 mg/cm²/month for CaO and 23 mg/cm²/month for $SiO_2$.

Comparative Example 7

15 mg/liter of polymer A-5 and 5 mg/L of phosphorus compound P-2 were added to water having the same water quality as Embodiment 5. Scale adherence was tested as described above. The scale adherence rate was 42 mg/cm²/month for CaO and 32 mg/cm²/month for $SiO_2$.

Comparative Example 8

20 mg/liter of polymer A-6 was added to water having the same water quality as Embodiment 5. Scale adherence was tested as described above. The scale adherence rate was 28 mg/cm²/month for CaO and 94 mg/cm²/month for $SiO_2$.

The results of Embodiments 5–8 and Comparative Examples 5–8 are shown in Table 4.

TABLE 4

| Example | Polymer Phosphorus compound | Concentration (mg/L) | Scale adhesion rate (mg/cm²/month) | |
|---|---|---|---|---|
| | | | CaO | $SiO_2$ |
| Embodiment 5 | A-1 | 15 | 5 | 4 |
| | P-1 | 5 | | |
| Embodiment 6 | A-2 | 15 | 6 | 3 |
| | P-2 | 5 | | |
| Embodiment 7 | A-3 | 15 | 6 | 4 |
| | P-3 | 5 | | |
| Embodiment 8 | A-1 | 12 | 3 | 2 |
| | A-4 | 3 | | |
| | P-2 | 5 | | |
| Comp. Ex. 5 | A-1 | 20 | 26 | 14 |
| Comp. Ex. 6 | A-3 | 20 | 21 | 23 |
| Comp. Ex. 7 | A-5 | 15 | 42 | 32 |
| | P-2 | 5 | | |
| Comp. Ex. 8 | A-6 | 20 | 28 | 94 |

Embodiment 9

15 mg/liter of polymer A-1 and 5 mg/L of phosphorus compound P-5 were added to water having the same water quality as Embodiment 1. Scale adherence was tested as described above. The scale adherence rate was 5 mg/cm²/month for CaO and 2 mg/cm²/month for $SiO_2$.

Embodiment 10

15 mg/liter of polymer A-2 and 5 mg/L of phosphorus compound P-6 were added to water having the same water quality as Embodiment 1. Scale adherence was tested as described above. The scale adherence rate was 6 mg/cm²/month for CaO and 2 mg/cm²/month for $SiO_2$.

Embodiment 11

15 mg/liter of polymer A-3 and 5 mg/L of phosphorus compound P-7 were added to water having the same water quality as Embodiment 1. Scale adherence was tested as described above. The scale adherence rate was 4 mg/cm²/month for CaO and 1 mg/cm²/month for $SiO_2$.

Embodiment 12

15 mg/liter of polymer A-1 and 5 mg/L of phosphorus compound P-8 were added to water having the same water quality as Embodiment 1. Scale adherence was tested as described above. The scale adherence rate was 8 mg/cm²/month for CaO and 4 mg/cm²/month for $SiO_2$.

Embodiment 13

15 mg/liter of polymer A-2 and 5 mg/L of phosphorus compound P-9 were added to water having the same water quality as Embodiment 1. Scale adherence was tested as described above. The scale adherence rate was 7 mg/cm²/month for CaO and 3 mg/cm²/month for $SiO_2$.

Embodiment 14

15 mg/liter of polymer A-7 and 5 mg/L of phosphorus compound P-10 were added to water having the same water quality as Embodiment 1. Scale adherence was tested as described above. The scale adherence rate was 6 mg/cm²/month for CaO and 4 mg/cm²/month for $SiO_2$.

The results from Embodiments 9–14 are shown in Table 5.

TABLE 5

| Example | Polymer Phosphorus compound | Concentration (mg/L) | Scale adhesion rate (mg/cm²/month) | |
|---|---|---|---|---|
| | | | CaO | $SiO_2$ |
| Embodiment 9 | A-1 | 15 | 5 | 2 |
| | P-5 | 5 | | |
| Embodiment 10 | A-2 | 15 | 6 | 2 |
| | P-6 | 5 | | |
| Embodiment 11 | A-3 | 15 | 4 | 1 |
| | P-7 | 5 | | |
| Embodiment 12 | A-1 | 15 | 8 | 4 |
| | P-8 | 5 | | |
| Embodiment 13 | A-2 | 15 | 7 | 3 |
| | P-9 | 5 | | |
| Embodiment 14 | A-7 | 15 | 6 | 4 |
| | P-10 | 5 | | |

Referring to Tables 3–5, it can be seen from these results that embodiments which used polymer A-1 having 100 mole % of N-vinyl formamide units, polymer A-2 having 90 mole % of N-vinyl formamide units, polymer A-3 having 60 mole % of N-vinyl formamide units or polymer A-7 having 60 mole % of N-vinyl acetamide units together with phosphorus compounds had a low adherence rate of CaO and $SiO_2$ scales, and there were excellent scale formation preventing effects.

In contrast, Comparative Examples 1 and 5 included only polymer A-1 without any phosphorus compound. Comparative Example 2 included only polymer A-2, and Comparative Example 6 included only polymer A-3. Scale adherence rates for these comparative examples were relatively high. Therefore, scale formation was not prevented if a phosphorus compound was not included with the polymer, even when the polymers contained at least 50% of N-vinyl formamide units.

Comparative Example 3 included a copolymer of acrylic acid and hydroxyallyloxypropane sulfonic acid, which is widely used in the prior art as a scale preventing agent. Comparative Example 8 included sodium polyacrylamide, which is also a prior art scale formation preventing agent. The scale adherence rate for these comparative examples were high compared to the embodiments of the present invention. Therefore, the scale preventing agents of the present invention demonstrate an excellent scale formation preventing effect, compared to the scale preventing agents of the prior art.

Furthermore, the scale adherence rate of Comparative Example 4, which included polymer A-6 and phosphorus compound P-2 jointly, was high compared to Embodiment 2, which included polymer A-2 and phosphorus compound P-2 jointly. Thus, the excellent scale preventing effect which is obtained by the joint use of polymers and phosphorus compounds in the present invention is demonstrated only with polymers which include N-vinyl formamide or N-vinyl acetamide units. Furthermore, as shown in Comparative Example 7, there is not an adequate scale preventing effect by polymer A-5, which has 40 mole % of N-vinyl formamide units, even when used in conjunction with phosphorus compounds. Therefore, the N-vinyl formamide units and the N-vinyl acetamide units must total at least 50% to create an adequate scale formation preventing effect.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A scale formation preventing agent for use in a water system, comprising:
   a polymer formed from at least 50% of at least one member of the group consisting of N-vinyl formamide units and N-vinyl acetamide units; and
   a phosphorus compound.

2. A scale formation preventing agent according to claim 1, wherein said polymer is at least one member selected from the group consisting of homopolymers of N-vinyl formamide, homopolymers of N-vinyl acetamide, copolymers of N-vinyl formamide and N-vinyl acetamide, partially hydrolyzed products of an N-vinyl formamide homopolymer, partially hydrolyzed products of an N-vinyl acetamide homopolymer, and partially hydrolyzed products of a copolymer of N-vinyl formamide and N-vinyl acetamide.

3. A scale formation preventing agent according to claim 1, wherein said polymer is at least one of a copolymer of N-vinyl formamide and a vinyl monomer and a copolymer of N-vinyl acetamide and a vinyl monomer.

4. A scale formation preventing agent according to claim 3, wherein said vinyl monomer is at least one member selected from the group consisting of (meth)acrylamide, (meth)acrylonitryl, N-methyl (meth)acrylamide, N, N-dimethyl (meth)acrylamide, methyl (meth)acrylate, ethyl (meth)acrylate, styrene, allyl alcohol, hydroxyethyl (meth) acrylate, mono (meth)acrylate of (poly)ethylene oxide of mole number 1–30, monoallyl ether of (poly)ethylene oxide of mole number 1–30, monovinyl ether of (poly)ethylene oxide of mole number 1–30, (meth)acrylic acid, α-hydroxyacrylic acid, crotonic acid, maleic acid, fumaric acid, itaconic acid, vinyl sulfonic acid, styrene sulfonic acid, 2-acrylamide-2-methyl propane sulfonic acid, 2-hydroxy-3-allyloxypropane sulfonic acid, isoprene sulfonic acid, allyl amine, quaternary ammonium salts of dimethyl amino ethyl (meth)acrylate, tertiary salts of dimethyl amino ethyl (meth) acrylate, quaternary ammonium salts of diethyl amino ethyl (meth)acrylate, tertiary salts of diethyl amino ethyl (meth) acrylate, and diallyl dimethyl ammonium chloride.

5. A scale formation preventing agent according to claim 3, wherein said vinyl monomer is an alkali metal salt of at least one member of the group consisting of (meth)acrylic acid, α-hydroxyacrylic acid, crotonic acid, maleic acid, fumaric acid, itaconic acid, vinyl sulfonic acid, styrene sulfonic acid, 2-acrylamide-2-methyl propane sulfonic acid, 2-hydroxy-3-allyloxypropane sulfonic acid, and isoprene sulfonic acid.

6. A scale formation preventing agent according to claim 1, wherein said polymer has a molecular weight from about 2,000 to about 1,000,000.

7. A scale formation preventing agent according to claim 1, wherein greater than one type of polymer having at least 50% of N-vinyl formamide units or N-vinyl acetamide units is included.

8. A scale formation preventing agent according to claim 1, wherein phosphorus compound is at least one member selected from the group consisting of sodium tripolyphosphate, sodium hexametaphosphate, nitro trimethylene phosphonic acid, hydroxy ethylidene diphosphonic acid, ethylene diamine tetramethylene phosphonic acid, phosphono butane tricarboxylic acid, amino methylene phosphonate, polyamino polyether methylene phosphonate, phosphono polycarboxylic acid, and bis(poly-2-carboxyethyl)phosphinic acid.

9. A scale formation preventing agent according to claim 1, wherein a ratio of said polymer to said phosphorus compound is between 1:9 and 9:1.

10. A scale formation preventing agent according to claim 1, wherein a ratio of said polymer to said phosphorus compound is between 1:1 and 4:1.

11. A scale formation preventing agent according to claim 1, further comprising at least one member selected from the group consisting of a corrosion preventing agent, an antibacterial agent, polyacrylic acid, polymaleic acid, copolymers of acrylic acid and 2-acrylamide-2-methyl propane sulfonic acid, a reaction product of N,N,N', N'-tetramethyl ethylene diamine with epichlorohydrin, and a reaction product of N,N,N', N'-tetramethyl ethylene diamine with dichloroethyl ether.

12. A method for preventing scale formation in a water system, comprising the step of adding a polymer formed from at least 50% of at least one member of the group consisting of N-vinyl formamide units and N-vinyl acetamide units and a phosphorus compound to a water system.

13. A method for preventing scale formation according to claim 12, wherein said polymer and said phosphorus compound are added to said water at a final total concentration between 1 and 100 mg/L.

14. A method for preventing scale formation according to claim 12, wherein said polymer is at least one member selected from the group consisting of homopolymers of N-vinyl formamide, homopolymers of N-vinyl acetamide, copolymers of N-vinyl formamide and N-vinyl acetamide, partially hydrolyzed products of an N-vinyl formamide homopolymer, partially hydrolyzed products of an N-vinyl acetamide homopolymer, and partially hydrolyzed products of a copolymer of N-vinyl formamide and N-vinyl acetamide.

15. A method for preventing scale formation according to claim 12, wherein said polymer is at least one of a copolymer of N-vinyl formamide and a vinyl monomer and a copolymer of N-vinyl acetamide and a vinyl monomer.

16. A method for preventing scale formation, according to claim 15, wherein said vinyl monomer is at least one member selected from the group consisting of (meth) acrylamide, (meth)acrylonitryl, N-methyl (meth) acrylamide, N,N-dimethyl (meth)acrylamide, methyl (meth) acrylate, ethyl (meth)acrylate, styrene, allyl alcohol, hydroxyethyl (meth)acrylate, mono (meth)acrylate of (poly) ethylene oxide of mole number 1–30, monoallyl ether of (poly)ethylene oxide of mole, number 1–30, monovinyl ether of (poly)ethylene oxide of mole number 1–30, (meth) acrylic acid, α-hydroxyacrylic acid, crotonic acid, maleic acid, fumaric acid, itaconic acid, vinyl sulfonic acid, styrene sulfonic acid, 2-acrylamide-2-methyl propane sulfonic acid, 2-hydroxy-3-allyloxypropane sulfonic acid, isoprene sulfonic acid, allyl amine, quaternary ammonium salts of dimethyl amino ethyl (meth)acrylate, tertiary salts of dimethyl amino ethyl (meth)acrylate, quaternary ammonium salts of diethyl amino ethyl (meth)acrylate, tertiary salts of diethyl amino ethyl (meth)acrylate, and diallyl dimethyl ammonium chloride.

17. A method for preventing scale formation according to claim 15, wherein said vinyl monomer is an alkali metal salt of at least one member of the group consisting of (meth) acrylic acid, α-hydroxyacrylic acid, crotonic acid, maleic acid, fumaric acid, itaconic acid, vinyl sulfonic acid, styrene sulfonic acid, 2-acrylamide-2-methyl propane sulfonic acid, 2-hydroxy-3-allyloxypropane sulfonic acid, and isoprene sulfonic acid.

18. A method for preventing scale formation according to claim 12, wherein said polymer has a molecular weight from about 2,000 to about 1,000,000.

19. A method for preventing scale formation according to claim 12, wherein greater than one type of polymer having at least 50% of N-vinyl formamide units or N-vinyl acetamide units is included.

20. A method for preventing scale formation according to claim 12, wherein the phosphorus compound is at least one member selected from the group consisting of sodium tripolyphosphate, sodium hexametaphosphate, nitro trimethylene phosphonic acid, hydroxy ethylidene diphosphonic acid, ethylene diamine tetramethylene phosphonic acid, phosphono butane tricarboxylic acid, amino methylene phosphonate, polyamino polyether methylene phosphonate, phosphono polycarboxylic acid, and bis(poly-2-carboxyethyl)phosphinic acid.

21. A method for preventing scale formation according to claim 12, wherein a ratio of said polymer to said phosphorus compound is between 1:9 and 9:1.

22. A method for preventing scale formation according to claim 12, wherein a ratio of said polymer to said phosphorus compound is between 1:1 and 4:1.

23. A method for preventing scale formation according to claim 12, further comprising adding to said water at least one member selected from the group consisting of a corrosion preventing agent, an antibacterial agent, polyacrylic acid, polymaleic acid, copolymers of acrylic acid and 2-acrylamide-2-methyl propane sulfonic acid, a reaction product of N,N,N',N'-tetramethyl ethylene diamine with epichlorohydrin, and a reaction product of N,N,N', N'-tetramethyl ethylene diamine with dichloroethyl ether.

* * * * *